Nov. 13, 1956     E. C. BYNUM     2,770,340
AUTOMATIC VARIABLE SPEED FLUID TRANSMISSION
Filed Jan. 26, 1955

INVENTOR.
EDWARD C. BYNUM
BY
ATTORNEYS

United States Patent Office 2,770,340
Patented Nov. 13, 1956

2,770,340

AUTOMATIC VARIABLE SPEED FLUID TRANSMISSION

Edward C. Bynum, Ridgecrest, Calif.

Application January 26, 1955, Serial No. 484,323

9 Claims. (Cl. 192—60)

(Granted under Title 35, U. S. Code (1952), sec. 266)

The invention described herein may be manufactured and used by or for the Government of the United States of America for governmental purposes without the payment of any royalties thereon or therefor.

This invention relates to variable speed mechanisms and more particularly to an automatic fluid clutch mechanism employing radially disposed pistons for transmitting a variable torque from a drive shaft to a driven shaft of any machine to which it may be associated.

Transmissions of this type are generally represented by Patent 1,893,654 issued to C. H. Roberts, and employ a plurality of radially disposed pistons arranged in a fluid housing. The piston cylinders are connected to the housing that is usually integral with a drive shaft, and the pistons are connected to a driven shaft through a slippage connection. The speed ratios between the drive and driven shafts are dependent on the degree of slippage between the piston and the driven shaft, which in turn is dependent on the extent of resistance offered by the fluid in the cylinder to the reciprocating action of the piston. As may be expected, numerous provisions have been made for controlling the fluid flow to and from the cylinders. For example, in the above patented transmission the fluid flow to the cylinder is manually controlled by the operator through a rotary valve and suitable linkage. The disadvantages of manual control are well recognized, but in addition, the foregoing system as well as other prior art transmissions, did not provide a plurality of distinct and predetermined speed ratios that could be automatically regulated according to the load demands. In other variable speed hydraulic transmissions of this type valves controlling the fluid flow to the pistons are operated by a complicated arrangement of control linkage and hydraulic piping resulting in a large, heavy and expensive transmission.

According to the present invention an improved control means is provided for a variable speed hydraulic transmission of the type utilizing a plurality of radial pistons disposed in a hydraulic cylinder wherein the piston cylinders are connected to a drive shaft usually through a fluid housing and the pistons are connected to the driven shaft usually through a slippage connection. The improved control means of this invention is automatic in operation and regulates the flow of fluid through the piston cylinder and which ultimately determines the degree of slippage in accordance with the centrifugal force exerted by the drive shaft. In the preferred embodiment the control means comprises a concentric sleeve slidably mounted with respect to and preferably on the cylinders, the sleeve being resiliently biased to position the sleeve in accordance with the applied centrifugal force. To control the acceleration or deceleration of the transmission, an outer concentric sleeve is slidably mounted on the inner sleeve and so designed as to enable the latter inner sleeve to vary the fluid flow out of the piston cylinder at fixed preselected positions corresponding to certain speed ratios between the drive and driven shaft. The outer sleeve is also spring biased so that the sleeves move successively depending on the differential force between the springs and the applied centrifugal force. A predetermined successive advance of the two sleeves is assured by a detent means which includes a ball mounted on the inner sleeve and capable of seating in corresponding seats on the adjacent walls of the cylinder and outer sleeve, the ball being of a diameter equal to the thickness of the sleeve, plus the depth of one groove.

A principal object of this invention is to provide a variable speed hydraulic transmission which is automatically controlled, preferably by the centrifugal force exerted by the drive mechanism.

A further object is to provide a control mechanism which will permit a sequential movement of two movable members with reference to a fixed member in accordance with a force applied to the movable members.

Another object is to provide such an automatic transmission capable of producing automatically regulated speed ratios to satisfy all operational requirements up to and including a direct drive, and further capable of being changed while under load.

Other objects are to provide a hydraulic transmission which is lighter, more compact, simple, and having a minimum of moving parts.

Other objects and many of the attendant advantages of this invention will be readily appreciated as the same becomes better understood by reference to the following detailed description when considered in connection with the accompanying drawings wherein.

Figure 1:
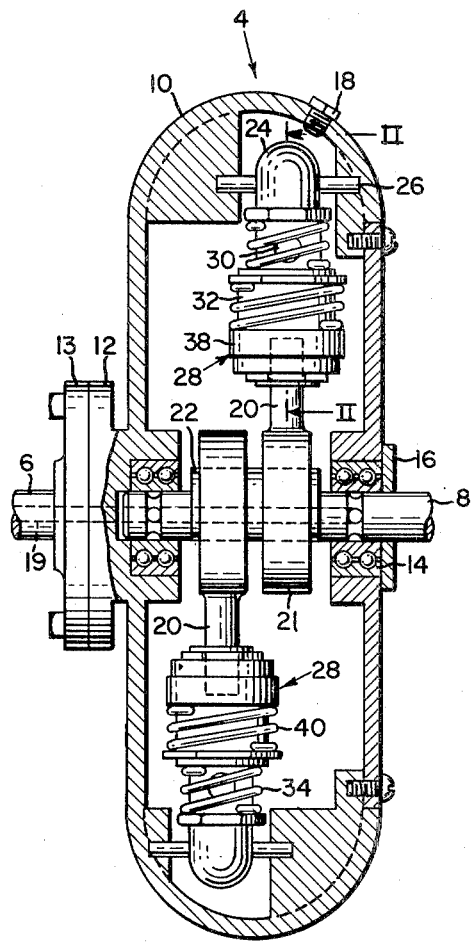
Fig. 1 is a vertical section of the transmission of this invention.

Referring now to the drawings, wherein like reference characters designate like or corresponding parts throughout the several views there is shown in Fig. 1 a transmission generally indicated at 4 which may be connected between a drive shaft 6 which may be the crank shaft of any engine or the like, and a driven shaft 8 that is usually coupled by conventional gearing to a load, not shown, which in a vehicle may be the rear axle. Positioned between the shafts is a cylindrical fluid housing 10 having an integral face plate 12 which is bolted or otherwise secured to a flange 13 splined to drive shaft 6. Driven shaft 8 extends into the housing rotatably supported at each end in suitable bearings 14, the housing being made fluid tight by a seal 16.

Housing 10 conveniently forms a chamber for a supply of oil or other suitable hydraulic liquid, and may be periodically filled, drained or bled through plug 18 located at the periphery of the housing. Where the drive shaft is a crank shaft of a combustion engine, the latter may also be used as an oil reserve for the transmission by providing a hollow drive shaft having a longitudinal passage 19 leading from the engine to the housing chamber. A two-way check valve, not shown, may be inserted in the passage for the admittance of oil into housing 10 at low pressure for replenishing purposes, and the oil exhausted at high pressure from the housing when expanded by heat generated by the transmission and in this manner insures that sufficient oil is present in the housing at all times for proper operation.

Torque is transmitted from the drive and driven shafts by one or more radially disposed pumping means, two being illustrated, each is identical, and may comprise a piston 20 connected at one end to driven shaft 8 by an eye portion 21 which slidably encircles an eccentric portion 22 of drive shaft 8 to effect a slippage connection. Piston 20 is reciprocably mounted in a corresponding cylinder 24 being preferably journaled to the housing by wrist pins 26 to allow the cylinder to rock from one side to the other of the longitudinal center line as eye portion 21 of the piston slips with respect to eccentric 22. If desired, this rocking action could also be accomplished by providing the piston with a pivotable piston rod and fixing the cylinder to the housing, however, such arrangement presents disadvantages over the preferred construction.

The degree of slippage between piston 20 and eccentric 22, and, consequently, the power ratio between drive and driven shafts, will depend on the extent of the reciprocating movement of piston 20, that in turn is controlled by the volume of oil present in cylinder 24 available to retard piston movement. A control means 28, presently to be described, automatically regulates the amount of oil in the cylinder in accordance with the centrifugal force exerted on the housing and constitutes an important feature of this invention.

Cylinder 24 is connected to the oil supply in the housing, or any other suitable source, through cylinder passages 30, shown as intersecting drilled holes extending diametrically through the top of cylinder 24. Control means 28 regulates the escape of oil from cylinder 24 by being movable with respect to the cylinder to restrict passages 30 and therefore meter the flow therethrough, and preferably comprises an inner concentric sleeve 32 slidably mounted on the cylinder. Conventional ring seals 33 may be seated in the cylinder on both sides of passages 30 to prevent oil leakage under pressure when sleeve 32 completely blocks the passages.

In order to regulate the movement of sleeve 32 in accordance with the rotational speed of the housing, a compression coil spring 34 is positioned around the cylinder and between the sleeve and a stop nut 36 threaded to the outer end of the cylinder to provide for adjustment of the spring tension. A stop nut 37 at the opposite end of the cylinder limits the inner movement of sleeve 32.

Spring 34 is shown extending across passage 30 which may cause some undesirable oil turbulence, however, this can be avoided by positioning the spring at the inner end of the sleeve, and a tension spring could be used instead of a compression spring. As the rotational speed of the housing varies constantly while accelerating to full speed so will the centrifugal force exerted on spring biased sleeve 32, the response being more or less instantaneous tending to cause an erratic and continuously changing speed ratio between drive and driven gears. Such operation is eliminated by employing an outer concentric sleeve 38 which functions as an acceleration control in regulating the movement of sleeve between speed ratios.

Outer sleeve 38 is slidably mounted on inner sleeve 32 being spring biased to an inward position by a concentric compression spring 40 bearing against a stop nut 42 on the outer end of inner sleeve 32; spring 40 and nut 42 functioning with respect to outer sleeve 38 as spring 34 and nut 36 do to the inner sleeve. A shoulder 44 on the inner end of sleeve 32 limits the inward travel of outer sleeve 38.

The two sleeves are successively advanced or retracted one at a time with respect to the cylinder by an interlocking mechanism that comprises a ball 46 seated in inner sleeve 32 and arranged to be seated alternately in a plurality of matting recesses 24b and 24d in the adjacent outer periphery of cylinder 24, and recesses 38a, 38c, and 38e formed in the inner adjacent periphery of outer sleeve 38. All recesses are formed to the same depth. The diameter of ball 46 is equal to the thickness of inner sleeve 32 plus the depth of one recess; and the piston and inner and outer sleeves are snugly fitted so that the ball will at any one time lock inner sleeve 32 to either the cylinder or the outer sleeve 38 depending on which recess the ball is seated. Each cylinder recess represents a given speed (R. P. M.) ratio between drive and driven shafts, and the particular speed value will depend on the location of the recess on the cylinder with reference to passages 30 and the tension of springs 34 and 40. Obviously, the number of cylinder recesses may vary depending on the particular use to which the transmission is adapted.

Another important feature of the invention resides in providing a controlled inlet passage 50 to the cylinder to supplement the admission of oil to the cylinder through passages 30 thus insuring that the cylinder is completely filled with oil on the return stroke so that the control means can meter the escape of the oil from the cylinder during the compression stroke and thereby control the amount of slippage of the pistons on the driven shaft eccentric. Inlet passage 50 is located in piston 20 being connected to the housing by side grooves 52 in the piston. A one-way check valve 54 is captured in inlet passage 50 being movable in one direction to allow the free flow of oil through the passage into the cylinder during the piston's return stroke, and to block passage 50 as soon as the piston starts a compression stroke to prevent the escape of oil from the cylinder that would by-pass control passages 30.

Figure 2:
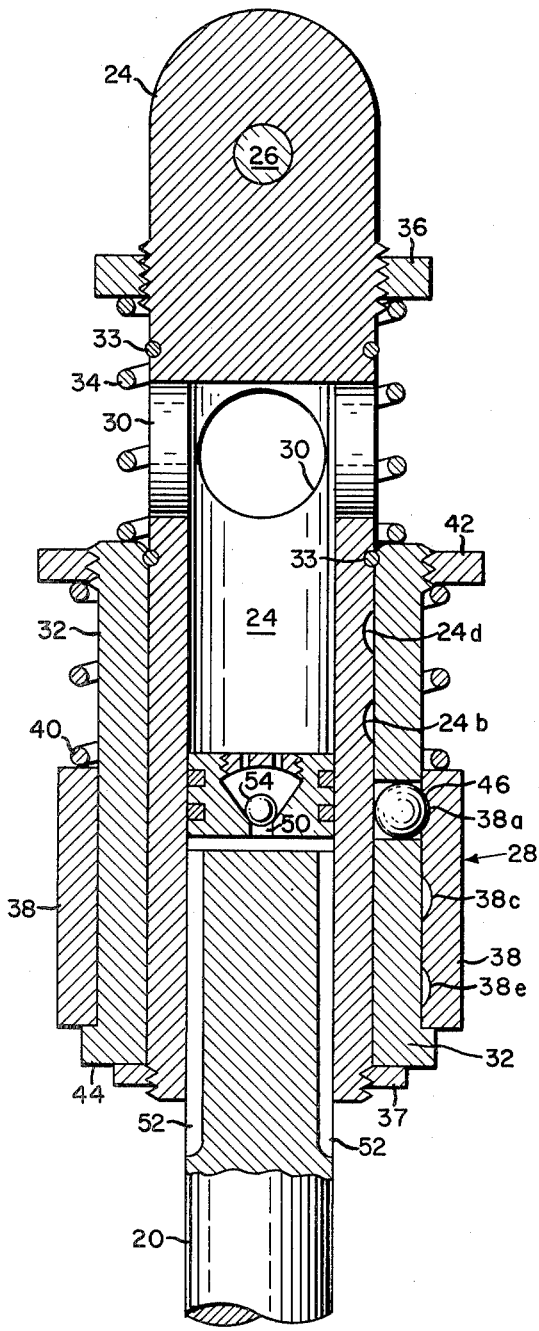
Fig. 2 is an enlarged section of a piston taken along line II—II of Fig. 1 showing the details of speed control.

The operation of the transmission will be described with reference to Fig. 2 where the control sleeves are shown in an at rest or idling position by the action of respective springs and the transmission is idling. Ball 46 is seated in recess 38a locking together sleeves 32 and 38.

In the ensuing description it will be assumed that the drive shaft 6 will gradually increase from a low idling R. P. M. to full speed as the operation progresses. Housing 10 being rotated by drive shaft 6 causes pistons 20 to reciprocate freely in cylinders 24 throughout its stroke, slipping around eccentric 22 and in this position is unable to overcome the static load on driven shaft 8. Pistons 20 freely reciprocate in their pistons because springs 34 and 40 are maintaining their respective sleeve members 32 and 38 in an innermost position resisting a small applied centrifugal force, passages 30 being completely uncovered to enable all the oil in the cylinder to be exhausted during the compression stroke.

As drive shaft speed gradually increases to where the centrifugal force on locked sleeves 32 and 38 is sufficient to compress spring 34, sleeve 32 is moved to a position where it commences to restrict the exhaust flow from the cylinders through passages 30 with a consequent retardation of the reciprocation of pistons 20 by the buffing action of the remaining oil in the cylinder unable to escape. The shortened stroke of piston results in the application of a small amount of torque to driven shaft 8 which commences to drive the load. As drive shaft speed increases, the amount of torque transmitted is gradually increased as described above until ball 46 reaches the first cylinder groove 24b at which time the centrifugal force on both locked sleeves 32 and 38 forces the ball from groove 38a and into groove 24b simultaneously locking inner sleeve 32 to the cylinder 24 and releasing outer sleeve 38 for further advance by gradually increasing centrifugal force. It is to be noted that when sleeves 32 and 38 were locked together by ball 46, spring 40 could not be compressed by the ensuing centrifugal force.

Inner sleeve 32 now being locked to the cylinder, the extent of fluid restriction on passage 30 will remain constant, as will the transmitted torque and therefore the speed ratio between the drive and driven shafts. This predetermined speed ratio setting will prevail until the acceleration of the drive shaft has increased to apply a centrifugal force on outer sleeve 38 sufficient to further compress spring 40 and advance sleeve 38 to where intermediate recess 38c is opposite to ball 46. As the compression force of spring 40 is now greater than the force of spring 34, ball 46 is forced into recess 38c, once again locking the sleeves 32 and 38 together and releasing them from the cylinder for an additional restricting movement over passages 30. Both sleeves are now acted upon by the increasing centrifugal force to further compress spring 34 and the speed ratio increases as the sleeve 32 further restricts the escape of oil from the cylinders through passages 30 until ball 46 is adjacent cylinder groove 24d and is seated therein at which time inner sleeve 32 has completely blocked passages 30 and the speed ratio is such that drive and driven shafts are in direct drive. In direct drive there are no moving parts in the transmission as the pistons have ceased to reciprocate.

As the speed of drive shaft decreases from full speed, the above described action of control means 28 is reversed and further description is considered to be unnecessary.

The transmission of this invention offers many advantages over the prior art apparatus in that it is fully automatic offering any number of predetermined speed ratio settings between drive and driven shafts. An individual piston control means is provided for each piston enabling the control on each piston to be independently adjusted to insure a balanced drive. Use of concentric sliding valve and acceleration sleeves eliminates the need for an elaborate piping system to supply the cylinders with oil thereby reducing the number of parts and consequently the weight of the transmission.

Although the control mechanism of this invention is particularly suitable for controlling the operation of a valve in a fluid clutch, it is obvious that it may be used for controlling any apparatus requiring a sequential control.

Obviously many modifications and variations of the present invention are possible in the light of the above teachings. It is therefore to be understood that within the scope of the appended claims the invention may be practiced otherwise than as specifically described.

I claim:

1. An automatic fluid clutch comprising a housing forming an outer fluid chamber, a drive shaft connected to the housing, a driven shaft rotatably mounted within the housing, a cylinder secured within said housing and having a fluid passage leading from the outer chamber into the cylinder chamber, a piston reciprocable in the cylinder chamber and connected to said driven shaft, a first control means reciprocable with respect to the cylinder and movable by centrifugal force to restrict the flow of fluid through said passage in accordance with the rotational speed of the driven shaft, a second acceleration control means movable by centrifugal force for releasably retaining said first control means in a plurality of predetermined positions representing different speed ratios between the drive and driven shafts until a predetermined rotational speed has been reached between positions.

2. An automatic fluid clutch comprising a housing forming an outer fluid chamber, a drive shaft connected to the housing, a driven shaft rotatably mounted within the housing, a plurality of radially disposed cylinders secured within said housing, each cylinder having a fluid passage leading from the outer chamber into the cylinder chamber, a piston reciprocable in each cylinder chamber and connected to said driven shaft through a slippage connection, a valve for admitting fluid from the outer chamber to the cylinder chamber on the return stroke of the piston, a control member slidably mounted on each cylinder and movable by centrifugal force to restrict the fluid flow out of the respective cylinders in accordance with the rotational speed of the drive shaft, and resilient means for resisting the restricting movement of the control member.

3. The apparatus of claim 2 wherein said valve comprises a one-way check valve.

4. An automatic fluid clutch comprising a housing forming an outer fluid chamber, a drive shaft connected to the housing, a driven shaft rotatably mounted within the housing, a plurality of radially disposed cylinders secured to said housing, each cylinder having an outlet passage leading from the outer chamber to the cylinder chamber, a piston reciprocable in each cylinder chamber and connected to said driven shaft through a slippage connection, a first control member slidably mounted on each cylinder and movable by centrifugal force to restrict the fluid flow out of the respective cylinder, a second control member slidably mounted on the first control member for releasably retaining said first control means in a plurality of positions representing different speed ratios between the drive and driven shafts, spring means supported on the cylinder for retarding the outward movement of the members, and means connecting said members for successively advancing the members in accordance with the rotational speed of the drive shaft.

5. The apparatus of claim 4 wherein said control members are concentric sleeves mounted on the cylinder.

6. An automatic fluid clutch comprising a housing forming an outer fluid chamber, a drive shaft connected to the housing, a driven shaft rotatably mounted within the housing, a plurality of radially disposed cylinders secured to said housing, each cylinder having an outlet passage leading from the outer chamber to the cylinder chamber, a piston reciprocable in the cylinder chamber and connected to said driven shaft through a slippage connection, an inner control sleeve slidably mounted on the cylinder and movable by centrifugal force to restrict the fluid flow out of the respective cylinder, an outer concentric sleeve slidably mounted on the inner sleeve for retaining said inner sleeve in a plurality of positions representing different speed ratios between the drive and driven shafts, a spring mounted on the cylinder for resisting the centrifugal movement of the inner sleeve, a second spring mounted on the inner sleeve for resisting the centrifugal movement of the outer sleeve, and detent means connecting said members to the cylinder for successively advancing the members in accordance with the rotational speed of the drive shaft.

7. The apparatus of claim 6 wherein said detent means comprises a rolling member mounted on the inner sleeve, and the adjacent surfaces of the cylinder and the outer sleeves are provided with recesses for seating the member.

8. An automatic fluid clutch comprising a housing forming an outer fluid chamber, a drive shaft connected to the housing, a driven shaft rotatably mounted within the housing, a plurality of radially disposed cylinders secured to said housing, each cylinder having an outlet passage leading from the outer chamber to the cylinder chamber, a piston reciprocable in the cylinder chamber and connected to said driven shaft through an eccentric connection, a one-way check valve for admitting fluid from the outer chamber to the cylinder chamber in the return stroke of the piston, an inner control sleeve slidably mounted around the cylinder and movable by centrifugal force to restrict the fluid flow out of the respective cylinder, an outer concentric sleeve slidably mounted around the inner sleeve for retaining said inner sleeve in a plurality of positions representing different speed ratios between the drive and driven shafts, a spring mounted on the cylinder for retarding the centrifugal movement of the inner sleeve, a second spring mounted on the inner sleeve for retarding the centrifugal movement of the outer sleeve, a ball rotatably mounted on the inner sleeve to project beyond the inner and outer longitudinal sleeve surfaces, adjacent surfaces of the cylinder and the outer sleeve provided with opposing recesses for seating the ball, said ball having a diameter substantially equal to the thickness of the inner sleeve plus the depth of one of the grooves, whereby the inner sleeve is successively and alternately locked to the cylinder and the outer sleeve during movement of the inner sleeve.

9. Control mechanism comprising three adjacent members one of which is fixed and the remaining two being movable, a spring for resisting the movements of each of said movable members in one direction, means for successively locking said movable members to the fixed member, said means comprising a detent member mounted on one of said members, said remaining members having at least one recess adapted to alternately receive said detent for locking the detent carrying member to the respective member seating the detent, whereby said movable members may be advanced against the retarding action of the springs in sequential movement in accordance with the force applied to said movable member.

References Cited in the file of this patent

UNITED STATES PATENTS

| | | |
|---|---|---|
| 1,609,782 | Small et al. | Dec. 7, 1926 |

FOREIGN PATENTS

| | | |
|---|---|---|
| 352,622 | Great Britain | July 16, 1951 |